Figure 1:
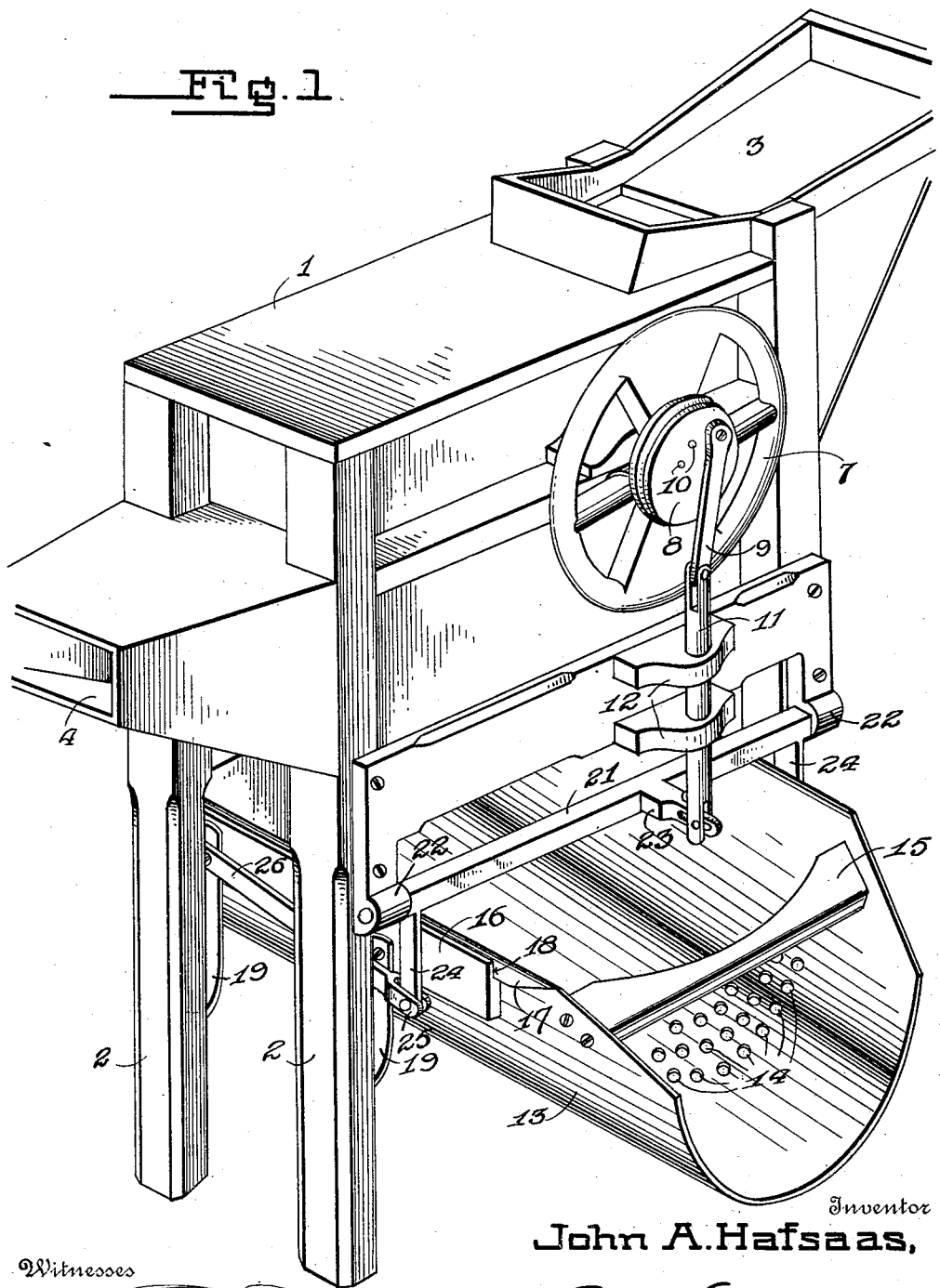

J. A. HAFSAAS.
SEED CORN GRADER OR SEPARATOR.
APPLICATION FILED MAY 19, 1910.

977,524.

Patented Dec. 6, 1910.

2 SHEETS—SHEET 1.

Witnesses
C. Everett Lancaster
Irv. L. McCathran

Inventor
John A. Hafsaas,
By E. E. Vrooman,
his Attorney

J. A. HAFSAAS.
SEED CORN GRADER OR SEPARATOR.
APPLICATION FILED MAY 19, 1910.
977,524.
Patented Dec. 6, 1910.
2 SHEETS—SHEET 2.
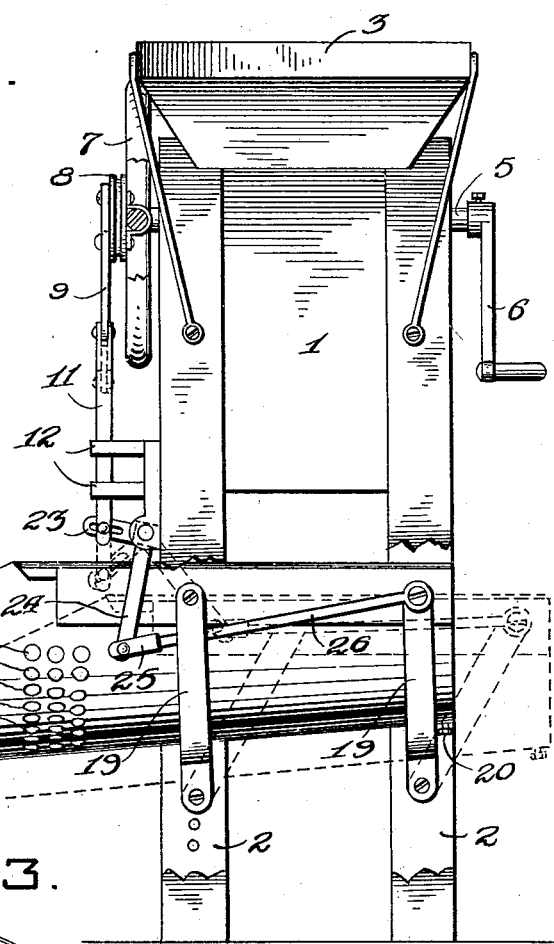
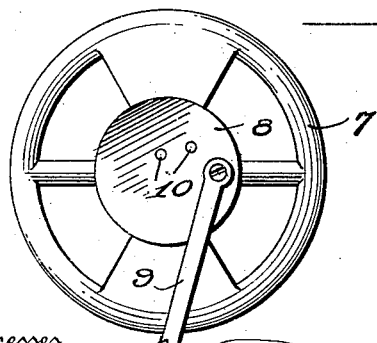
Inventor
John A. Hafsaas.

UNITED STATES PATENT OFFICE.

JOHN A. HAFSAAS, OF GROSS, NEBRASKA.

SEED-CORN GRADER OR SEPARATOR.

977,524.  Specification of Letters Patent.  Patented Dec. 6, 1910.

Application filed May 19, 1910. Serial No. 562,241.

*To all whom it may concern:*

Be it known that I, JOHN A. HAFSAAS, a citizen of the United States, residing at Gross, in the county of Boyd and State of Nebraska, have invented certain new and useful Improvements in Seed-Corn Graders or Separators, of which the following is a specification, reference being had therein to the accompanying drawing.

This invention relates to seed corn graders and separators, and has for its object to provide an improved apparatus of this character by means of which seed corn may be effectively graded and separated.

The invention consists in an improved seed corn grader and separator and in details of construction thereof as hereinafter set forth and claimed.

Referring to the accompanying drawings: Figure 1 is a view in perspective and in elevation of a seed corn grader and separator constructed in accordance with this invention. Fig. 2 is a view in elevation with parts broken away, showing the end of the supporting frame and a side view of the chute mounted in its supports. Fig. 3 is a detail view of the fly wheel and a portion of the pitman.

In carrying out the invention, the device is mounted in the usual form of corn shelling framework comprising the casing 1 mounted on supports or uprights 2 having in its top the usual form of feed trough or hopper 3, to which the ears of corn are fed to the casing 1 and the discharge chute 4 from which the cobs are discharged after the corn is shelled. The apparatus for shelling the corn which forms no part of the present invention and is therefore not shown, is inclosed within the casing 1. The ends of the shaft 5 of the corn-shelling mechanism project through the sides of the casing 1, and on one end thereof is mounted a crank handle 6, and on the other end a fly-wheel 7 having a disk 8 to which is pivotally connected one end of a pitman 9 which may be adjustably connected with the disk 8 by means of a series of holes 10 therein, so arranged that by changing the pivot pin of the pitman 8, from one hole to another, the throw of the pitman will be accordingly changed so as to adjust its movement to the speed required. The other end of the pitman 8 is pivotally connected with the upper end of a rod 11 adapted to reciprocate in brackets 12 projecting from the main support of the device.

Suspended beneath the casing 1 is a chute 13 preferably having its bottom provided with a number of apertures 14 for seed corn to pass through, the front end of said chute being braced by a cross piece 15. The chute 13 is mounted in longitudinal side bars 16, and is detachably engaged therewith by means of lateral longitudinal flanges 17, at the top of the sides of said chute, said flanges 17 being slidably seated in longitudinal grooves 18 in the longitudinal strips 16. The strips 16 are pivotally secured to the upper end of vertical arms 19, the lower ends of said vertical arms 19 being pivoted to the uprights 2. The chute 13 may be detached from its supports by removing the set screw 20 engaging it with the back piece of the side bars 16 and sliding the chute out of engagement with the side bars 16. Extending across the frame of the apparatus above the chute 13 is a rotary bar 21 having its ends mounted in sockets 22 on the main frame, and having a central projecting arm 23 pivotally connected with the lower end of the reciprocating rod 11. The rotary bar 21 has adjacent to its ends depending arms 24 which are pivotally connected with a forked end 25 of a lever arm 26 which is pivotally connected at its other end with the upper end of one of the arms 19.

If desired, the holes or apertures 14 in the chute 13 may be covered with a suitable removable cover so as to permit the seed corn to pass out of the end of the chute.

The operation of the device is as follows: When the shaft 5 is rotated by means of the handle 6, the shelling mechanism removes the seed corn from the cob and the seed corn drops through an opening in the bottom of the casing 1 into the chute 13. As the shaft 5 is rotated, the mechanism connecting the wheel 7 with the side bars 16 causes the chute to be reciprocated or shaken, thereby feeding the seed corn out of the chute.

While a particular form of mechanism is shown and described connecting the corn shelling mechanism with the chute, the invention is not limited thereto, since any suitable mechanism may be employed by means of which the chute may be shaken. Furthermore, the chute may be detachably mounted in any suitable manner upon the reciprocating mechanism.

Having described the invention, I claim:

In an apparatus of the character described, a casing, a corn shelling mechanism in said casing, a manually operated rotary shaft extending through said casing and connected with said corn shelling mechanism, a fly wheel mounted on one end of said shaft, a rock shaft having depending arms and mounted on said frame and having a lever arm, a reciprocating rod pivotally connected to said lever arm, a pitman connecting said fly wheel with said reciprocating rod, a reciprocating frame located beneath said casing, vertical arms pivoted at one end to the frame of the casing and at their other end to said reciprocating frame, levers pivotally connecting said reciprocating frame with the depending arms of the rock shaft, and a chute mounted on said reciprocating frame.

In testimony whereof I hereunto affix my signature in presence of two witnesses.

JOHN A. HAFSAAS.

Witnesses:
S. S. PARSONS.
L. A. WOODS.